United States Patent [19]

Waschkuttis

[11] Patent Number: 5,019,142
[45] Date of Patent: May 28, 1991

[54] SOOT FILTER FOR DIESEL VEHICLES

[76] Inventor: Gerhard Waschkuttis, Haustrasse 52, 8551 Wiesenthau, Fed. Rep. of Germany

[21] Appl. No.: 353,748

[22] Filed: May 16, 1989

[30] Foreign Application Priority Data

May 17, 1988 [EP] European Pat. Off. .......... 8806440.9

[51] Int. Cl.⁵ ............................................. B01D 46/24
[52] U.S. Cl. ........................................ 55/429; 55/523; 55/DIG. 30; D60/311
[58] Field of Search ................. 55/429, 523, DIG. 30, 55/283, 301; 60/281, 303, 311

[56] References Cited

U.S. PATENT DOCUMENTS

| | | | |
|---|---|---|---|
| 3,839,185 | 10/1974 | Vicard | 55/283 X |
| 4,571,938 | 2/1986 | Sakurai | 60/303 |
| 4,581,050 | 4/1986 | Krantz | 55/429 X |
| 4,604,868 | 8/1986 | Nomoto et al. | 55/DIG. 30 X |
| 4,608,640 | 8/1986 | Shinzawa et al. | 55/283 X |
| 4,651,524 | 3/1987 | Brighton | 55/DIG. 30 X |

Primary Examiner—Charles Hart
Attorney, Agent, or Firm—Malin, Haley, McHale, DiMaggio & Crosby

[57] ABSTRACT

Soot filter for diesel vehicles. A filter unit within a casing, preferably with conical-shaped exhaust supply and exhaust-discharge pieces (Abgaszu und Abgasabfuhrstutzen), a filter structured with numerous, parallel channels, divided by thin filter walls, with half of the channels (unrefined gas channels) open to the exhaust supply piece and the other half (refined gas channels) to the exhaust discharge piece, while they are all sealed at the opposite end, with the unrefined gas channels leading into the soot chamber equipped with a soot discharge opening, which may be closed.

14 Claims, 4 Drawing Sheets

SOOT FILTER FOR DIESEL VEHICLES

This application claims priority based upon the copending German application, filed on May 17, 1988, pursuant to 35 USC 8, 119.

BACKGROUND OF THE INVENTION

1. Field of the Invention

This invention relates to a soot filter for diesel engines, and more particularly to a soot filter which allows accumulated soot to be removed from the filter by "blowing out" the soot from the filter under exhaust gas pressure.

2. Prior Art

Filters basically comprising an encased filter unit having conical-shaped exhaust supply and exhaust discharge pieces, and also having a multitude of parallel channels separated by thin filter walls, whereby half of the channels are open to the exhaust supply piece and thus to the engine exhaust and the other half to the exhaust discharge piece and thus to the tailpipe, with the parallel channels closed off at the opposite end to the open ends, are already known in varied forms in the art. They have one basic problem in common, namely the clogging of the filter walls by soot after a certain period, which causes a high-pressure build-up, resulting in the filter losing its efficiency. This necessitates cleaning the soot deposits, usually meaning in addition to a chemical cleaning, a burn-off of the filter inserts.

Since this procedure usually cannot be done with the filter operating while the engine is running, but only when the motor is shut-off, and since the danger exists that the ceramic material of the filter might be damaged by over-heating during the burn-off, causing complete destruction of the filter, there is a need for a better, simpler, more delicate method of cleaning the filter. Despite the soot burn-off, the problem of the clogged filter walls and increased pressure build-up persists because the remaining particles or ashes from the burn-off are still in the filter, preventing the circulation of the exhaust gases from the unrefined gas channels to the refined gas channels. This is a problem in want of a solution.

SUMMARY OF THE INVENTION

It is this problem that motivated the invention of a soot filter which facilitates the cleaning of the filter-body in a simpler, more delicate and more efficient manner. The filter comprises a filter unit within a casing, preferably having a conical-shaped exhaust supply and exhaust discharge piece, a filter having numerous, parallel channels, divided by thin filter walls, with half of the channels open to the exhaust supply piece and the other half to the exhaust discharge piece. The parallel channels open to the exhaust discharge piece are sealed at their ends furthest from the exhaust discharge piece. The parallel channels open to the exhaust supply piece are open at their opposite end to a soot chamber equipped with a soot discharge opening, which may be closed. Hereafter, the channels open to the exhaust supply piece will be interchangeably referred to as unrefined gas channels while the channels open to the exhaust discharge piece will be interchangeably referred to as the refined gas channels.

To solve the aforementioned problem the filter is equipped with a soot chamber having a soot discharge device which can be closed. The soot chamber is a sealed chamber having openings into the ends of the unrefined gas channels whereby the unrefined gases may flow through the unrefined channels and into the soot chamber. The soot chamber also has a soot discharge outlet device which allows the contents of the soot chamber to exit.

The prior art types of soot filters had unrefined gas channels having their ends opposite the end open to the exhaust supply piece closed off. This configuration defines unrefined gas channels which are shaped like pockets. This same configuration holds true for the refined gas channels, with the difference that the refined gas channels open onto the exhaust discharge side and not on the exhaust supply side.

The instant invention has the unrefined gas chambers closed off not immediately at their ends closest to the exhaust discharge side, but instead, all the unrefined gas channels are open into a soot chamber at the exhaust discharge end of the filter unit, which soot chamber may be closed. When the soot chamber is closed and the soot filter is operating, the effect on the unrefined gas channels remains the same as that which occurs using the prior art devices. The unrefined gas enters the unrefined gas channels and must penetrate the walls to the refined gas channels, as it cannot escape through the closed soot chamber. At penetration of the filter walls, the soot deposits on the inner walls of the unrefined gas channels. The exhaust gas purified from soot and other impurities travels through the refined gas channels into the exhaust discharge piece and from there to the exhaust pipe where it is discharged.

The addition of a selectively openable soot chamber according to the instant invention has the advantage that, whenever necessary, cleaning of the unrefined gas channels can simply be done by opening the soot discharge outlet of the soot chamber, so that the soot particles deposited on the walls are carried with the exhaust gas and expelled through the soot chamber and out of the soot discharge outlet. In this manner, at the same time, soot particles which have already reached the soot chamber due to vibration and the draft of the gas are also expelled. This removes particles which, except for the operation of a soot chamber with a soot discharge device, would have contributed to the clogging and shortened life of the filter. By life of the filter is meant the time span in which the filter efficiently functions, before the clogging of the filter walls with soot and the rise of pressure renders operation inefficient.

The invented soot chamber may be easily added to an existing prior art filter having parallel filtering channels by installing a diagonal wall in the filter encasement between the parallel channels and the exhaust discharge piece. This creates a mid-chamber within the filter body.

The structure may be arranged either so that the refined gas channels are extended through the mid-chamber and into the end chamber connected to the exhaust pipe, so the mid-chamber forms the soot chamber, or, that the pipes of the unrefined gas channels are extended to the end chamber, forming the soot chamber, and that the mid-chamber is equipped, preferably on the side, with a refined gas discharge. In this last type, the refined gas discharge piece for the mid-chamber could be in the usual manner, coaxial, to the mostly cylindrical-shaped encasement, and in this case co-axial within the discharge line of the soot chamber. In this case, however, it would be necessary that the pipes connecting the unrefined gas channels with the end chamber, are conically grouped along the outer edge of the filter encasement in order to leave sufficient space for the refined discharge line in the middle. This configuration proves quite difficult to construct, especially if there are many channels and corresponding many pieces of pipe extending through the mid-chamber.

The structure of the soot filter may include a soot bag or something similar attached to the soot discharge device, so that the soot collected from the blow out of the unrefined gas channels through the soot chamber and out of the soot discharge device may be collected and removed.

Naturally, it is possible to burn off the deposited soot in the unrefined gas channels in the usual manner, by introducing a flame into a chamber at the exhaust supply piece. In this case, the instant invention provides the possibility of allowing a direct draft through the unrefined channels, by opening the soot discharge device. This possibility was not available with the conventional pocket channels and proves to be a considerable improvement for the burn-out and also has the possibility of expelling all types of ash and other impurities, including those created by the burn-out, so that no soot or ash remains within the channels.

For the expulsion of the soot by opening the soot discharge device, a provision can be made for a by-pass line between the soot discharge device and a downstream point of the refined gas exhaust pipe. This allows the installation of a second soot filter with a soot burn off device. To clean the main soot filter attached to the diesel motor exhaust pipe, the soot discharge opening of the main soot filter's soot chamber must be opened and the soot is carried by the unrefined motor exhaust gases into the second filter where it is deposited. Then, and this takes only a very short time, the soot discharge line of the main soot filter is closed again so that the motor may continue to function without any problem. The burn off then takes place in the second soot filter, and not in the main soot filter.

In operation, a soot filter will be equipped with a burn off device which contains an air and fuel supply line as well as an ignition device installed in the area of the exhaust supply piece. In addition, the exhaust supply piece of the filter has double walls defining a fuel or air, or both, mix and distribution chamber. The inner wall is equipped around its interior with a multitude of burn openings.

The fuel supply line, preferably a gas line, penetrates only the outside wall of the double-walled exhaust supply piece so that the fuel is properly distributed between the double walls of the mix and distribution chamber to guarantee an even burning all over the entire inner part of the filter, so that also an even burning of the filter body may take place. The air supply lines penetrate the distribution chamber completely and are equipped with one-way valves and pulse air valves, so that they are closed after starting the motor through the exhaust pressure. When the motor is shut off and the burn-off device turned on, they can open to induce air into the exhaust supply piece.

If desired, an additional high pressure air line may be added, in order to increase the flow through the filter at the time of the burn off of the filter. Such a circulation increase for a better burn off of the soot on the filter body may be achieved through the further adaptation of the invention of installing, downstream from the filter, a blower for the suction of the exhaust gases. The blower may either be a suction type device attached to the side of the exhaust pipe, in which case the end of the exhaust pipe needs to be equipped with a swivel lid, which with the blower in operation, closes without drawing air. On the other hand a pressure blower, downstream, and inclined, leading into the exhaust line may be installed, because such a pressure blower causes strong air circulation through the end of the exhaust pipe, while at the junction a static negative pressure results, which causes increased suction of the burn off gases at burn off of the soot on the filter body, thus causing a better, cleaner burn off which is especially more delicate by maintaining lower temperatures on the filter body.

These measures of the special adaptation of the soot burn-off device through the double walled exhaust supply piece and the achieving of a better burn-off by suction of the burn gases with the help of a suction or specially attached pressure blower may be applied also to conventional soot filters and be very beneficial. In any case it is preferred to provide a common soot chamber for the unrefined gas channels on their ends furthest from the exhaust supply piece, as this will facilitate the cleaning process greatly. The burn-off with such a system will be much more delicate and more even than it would be with channels closed off on one side as is now done in the art, where there is the danger of local heat overload due to incomplete circulation down the unrefined gas chambers, with the possibility of the breaking and destruction of the filter body.

Further advantages, characteristics and details of the invention will be apparent from the following detailed description of the invention.

DETAILED DESCRIPTION OF THE INVENTION

Figure 1:
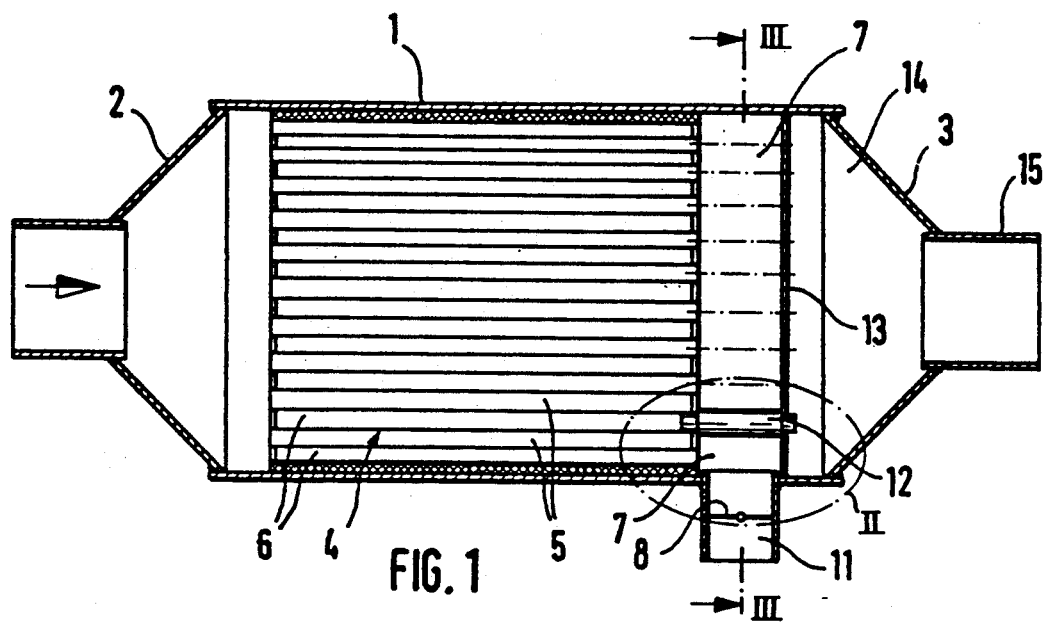
FIG. 1 is a sectional view of the invented soot filter with the unrefined gas channels leading into the soot chamber.

In a metallic encasement 1 with conical shaped exhaust supply piece 2 and the exhaust discharge piece 3, a filter body 4, made of metal or ceramic, is provided, as shown in FIG. 1. The filter body contains a multitude of channels running parallel to each other. One half of them are the unrefined gas channels 5, open to the exhaust supply piece 2 and sealed at the other end, in a soot chamber 7 as will be described in more particularly hereafter. The other half are the refined gas channels 6 which are sealed at the exhaust supply piece and open to the exhaust discharge piece 3.

Figure 2:
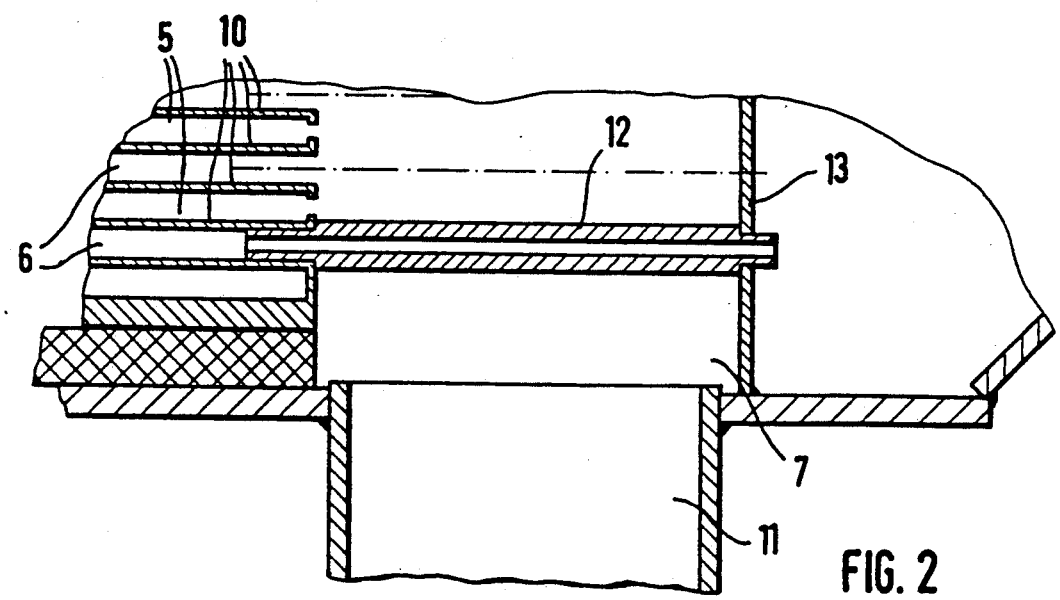
FIG. 2 is an enlarged view of the area II in FIG. 1.

The gas entering the unrefined gas channels 5 travels through the thin filter walls 10, as shown in FIG. 2, to the refined gas channels, whereby the soot deposits on the channel walls.

According to the invention, the unrefined gas channels 5 are not simply sealed at the end opposite exhaust supply piece 2, as are the refined gas channels at the opposite side to the exhaust discharge piece 3, but the unrefined gas channels 5 all lead into a soot chamber 7, which through a locking device 8, schematically shown as a plate, can also be opened at will.

In operation the locking device 8 is set, so that the soot chamber 7 remains closed, which has the same effect as if each of the unrefined gas channels was closed off singularly at the end before entering the soot chamber 7. The unrefined gas penetrates the thin filter wall 10 to the refined gas channels, a process by which the soot is deposited.

The invented soot chamber locking device 8 has a soot discharge opening 11 which may be closed. This offers the possibility of blowing out the soot through the soot chamber 7, the soot locking device 8, and soot discharge opening 11 when the unrefined gas channels 5 are clogged, by simply opening the locking device 8 allowing the exhaust gases to find the easiest way to escape. This means that the exhaust gases do not travel through the filter walls 10, but flows at high velocity through the unrefined gas channels 5 carrying the soot particles along and discharging them through the soot discharge opening 1. Further details of this process will be described hereafter.

Figure 3:
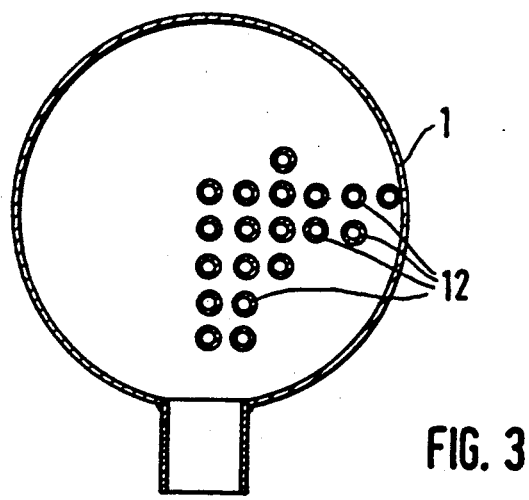
FIG. 3 is a sectional cross-section view along line III—III in FIG. 1.

The provision of the soot chamber 7 requires pipes 12, as shown in FIGS. 2 and 3, to connect the refined gas channels 6 to the discharge piece 3. These pipes 12, tapered on either end, will be inserted into the refined gas channels 6 at one side and on the other end into the coaxial pocket bores in the diagonal wall 13. Diagonal wall 13, together with the border of the filter body 4 furthest from exhaust supply piece 2, forms a boundary of the soot chamber 7 in the encasement 1.

Besides the discharge of the soot by blow-out through opening the soot discharge opening 11, the invented soot chamber 7 has an additional advantage at the burn-off of the filter body. Partially, the soot particles will stick to the walls 10 so that it is impossible to expulse them simply by blow out. Removal of these particles requires a burn off in addition to the blow out. Because the unrefined gas channels 5 of the instant invention are then open on both ends, at burn-off a more rapid draft through unrefined gas channels 5 will result, so that the expulsion of all ash particles, including those adhering to the sides of the walls 10, may b made and the filter walls 10 of the filter body 4 do not heat to the point of destruction.

Figure 4:
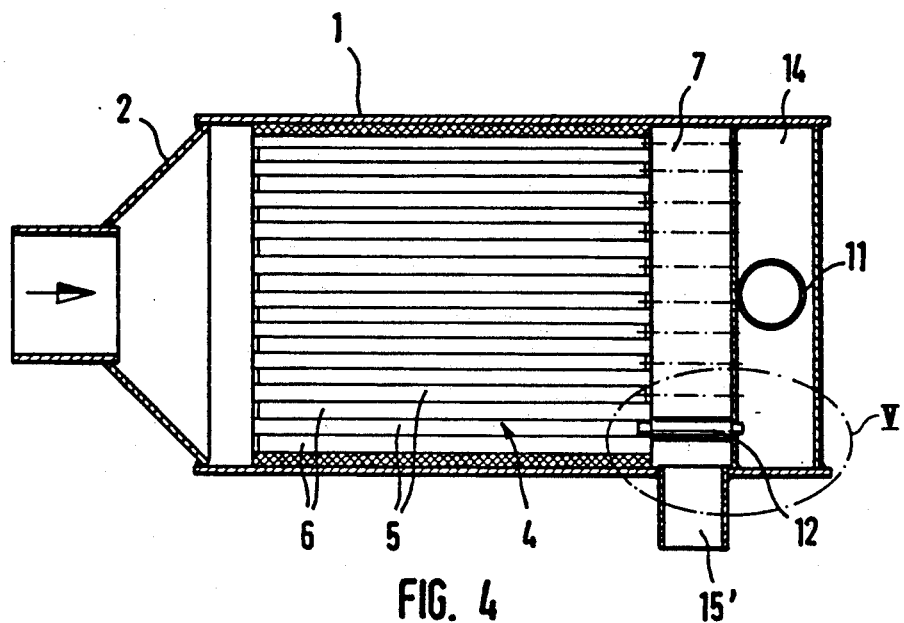
FIG. 4 is a sectional view of an alternate embodiment of the instant invention, where the soot chamber forms the end chamber of the filter encasement.
Figure 5:
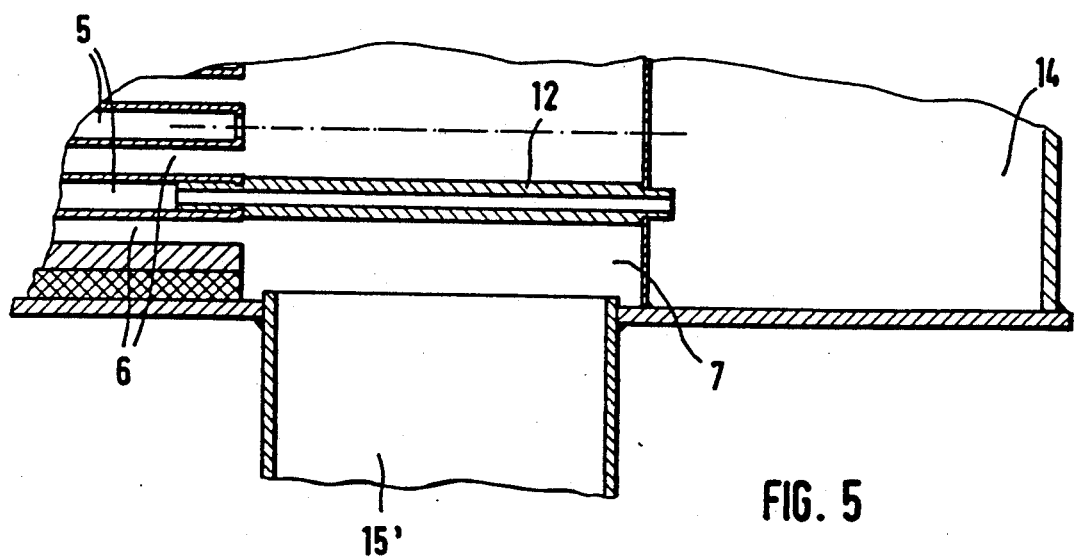
FIG. 5 is an enlarged view of area V in FIG. 4.

FIGS. 4 and 5 show an alternate embodiment of the invention. There, the chamber 1 is not the soot chamber as in the previous embodiment where the soot chamber 7 is between the filter body 4 and the wall 13. Instead, the end chamber 14 forms the soot chamber, while the mid-chamber 7' forms the common collecting chamber for the refined gas channels 6, so that the refined gas discharge opening 15, which in FIG. 1 was placed coaxial to the unrefined gas supply opening, is not in FIG. 4 attached to the side of mid-chamber 7' as a discharge opening 15'. For this purpose according to the examples in FIGS. 4 and 5, the refined gas channels 6 are not connected through the pipes 12 with the end chamber 14. Instead, the unrefined gas channels 5 are connected through pipes 12 to the end chamber 14. The refined gas channels 6, however, open freely into the mid chamber 7'.

Figure 6:
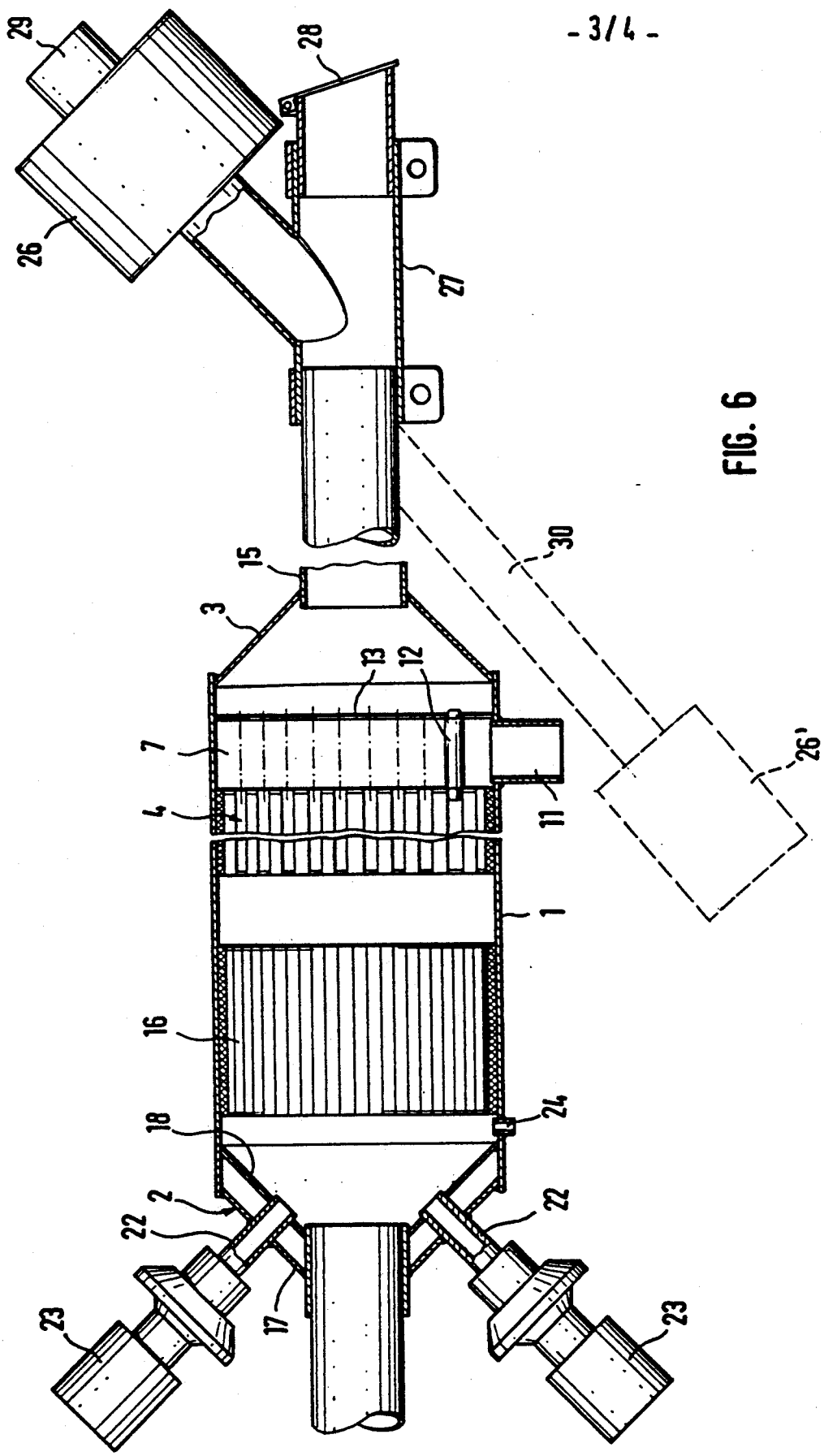
FIG. 6 is a longitudinal sectional view through the soot filter with a soot chamber and accessories for the soot deposit as well as the soot burn-off.
Figure 7:
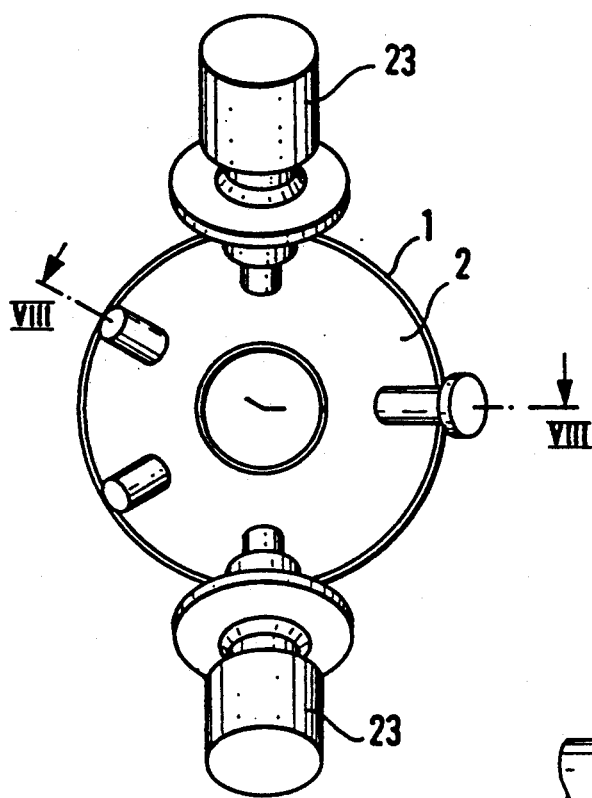
FIG. 7 is an end view of the embodiment shown in FIG. 6, with some of the connecting lines and parts removed.

FIG. 6 shows a further attachment to the embodiment of FIG. 1 having the mid chamber 7 as soot chamber and the soot discharge opening 11 on the side. In this embodiment, before the soot filter body 4, a gas diffusor 16 in the form of a honeycomb catalyst is put in place. It serves to create a more even distribution of the exhaust gases and thus a more even deposit on the soot filter body 4. At the same time, this more even distribution allows a better and more even burn-off of the soot on the filter surfaces.

Figure 8:
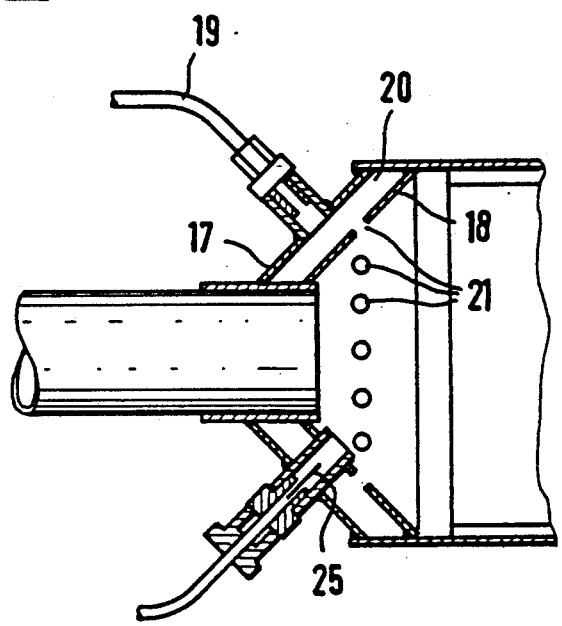
FIG. 8 is a cut away side view along the angular line VIII—VIII in FIG. 7.

Furthermore, in this embodiment is provided an exhaust supply piece 2 equipped with double walls, inner conus wall 18 and outer conus wall 17. The induction of fuel through fuel supply line 19 is in the space between the two conus walls 17 and 18, so that this space (as best illustrated in FIG. 8) forms a mix and distribution chamber 20 having a great number of burner openings 21. This burner openings 21 are placed around the inner conus 18, guaranteeing an even flame distribution and thus a more even burn-off. Even though it is possible in special cases to induce air into this distribution chamber 20, this embodiment uses a different provision for inducing air. In this embodiment, the air supply lines 22, equipped with pulse-air valves 23, penetrate completely the double walls 17 and 18 of the exhaust supply piece 2 into the open area created by the wall 18 and diffuser 16. During normal motor operator, the pulse air valves 23 automatically close off the air supply openings creating effectively a one way valve. When the motor is shut off and if it is deemed necessary to burn off the soot filter, then the pulse air valves 23 are opened at the influx of fuel through fuel supply line 19, circulation of the gases through the soot filter, and the igniting of the mixture with the help of a burn electrode 24. The air valves 23 provide the necessary air supply for the burn off.

A temperature sensor 25 is provided to measure the temperature of the burning process and regulating the fuel supply. The air supply may be regulated as well.

To aid the flow of gases during the burn-off process of the filter body, a suction blower 26 may be attached to the side of the exhaust pipe 27. A swivel lid 28 at the end of the exhaust pipe 27 closes during the burning process to avoid the suction of air into the filter body 4 from the exhaust pipe 27. Closing lid 28 assures that the suction really takes place through the filter body 4. During regular motor operation, the blower 26 is shut off and thus the exhaust 29 remains blocked, so that the exhaust gases may be expelled normally through the exhaust pipe by opening the lid 28 in the upward position.

Instead of a suction blower 26, a pressure blower 26' as shown in FIG. 6 by hatched lines, may be used, which through an inclined pipe 30 leads into the exhaust pipe 27. The velocity of the flow of gases provided by pressure blower 26' causes a sub-pressure at the junction into the exhaust pipe 27, which in turn provides for a better flow through the filter body. When using such a pressure blower with a specifically inclined pipe 30, the lid 28 would be unnecessary.

Figure 9:
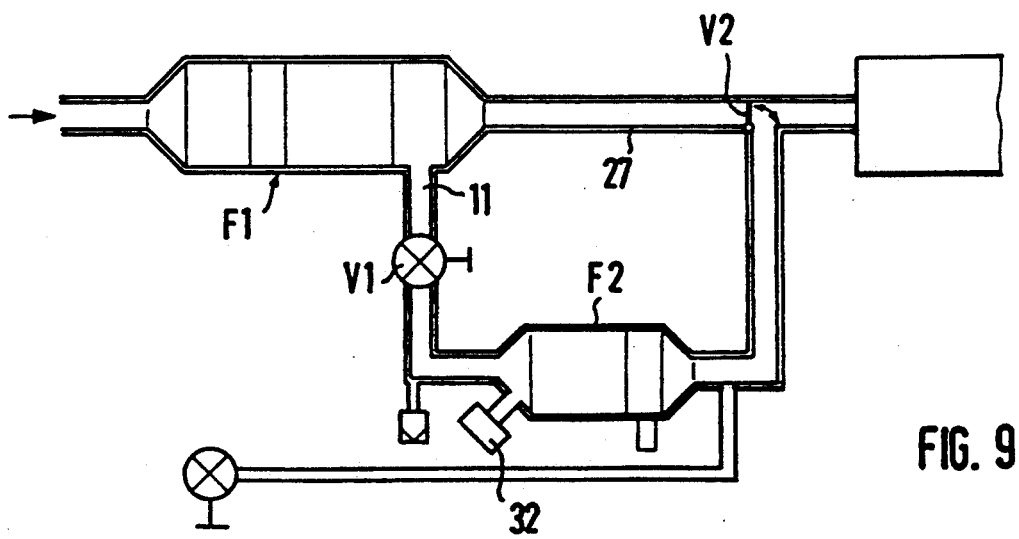
FIG. 9 is a schematic design of the double soot filter embodiment, where the second soot filter is attached to the soot chamber of the main soot filter in a by-pass fashion.

FIG. 9 depicts a tandem structure, where the soot discharge opening 11 of the main soot filter F1 is attached to a second filter F2 through a valve V1. In combination with the embodiment of FIG. 1, valve V1 is the locking device 8, although the teachings of this embodiment may be applied to any of the previously described embodiments. The exhaust pipe 27 from main soot filter F1 is connected to the exhaust pipe 27' of second filter F2 by a shutter V2 in by-pass fashion. When the valve V1 is closed, this embodiment functions just like the soot filter devices in FIG. 1 through 8 with the possibility of attaching the blowers 26 and 26' which for reasons of clarity of FIG. 9 have been omitted. In order to clean the main soot filter F1, the valve V1 is opened, whereby the soot is not simply discharged into a soot bag for example, or something similar, but travels to the second soot filter F2.

Then the valve V1 is closed again, so that the main soot filter may function normally in the exhaust stream of the motor and the motor may continue to run, while now the soot, without interference with the motor function, is burned in the second soot filter F2 by the burn-off device 32, which is schematically depicted, and which may include air supply lines and fuel supply lines and ignition, etc. according to the previous description. Instead of directing the soot from the main soot filter F1 into the second soot filter F2 where it may be burned off while the diesel motor is still running, it is also possible to clean the soot filter F1 by blow out with or without suction, without the use of burn off, as has been already described above.

Although the instant invention has been described by reference to specific embodiments, the invention is not limited to the depicted examples. Obvious changes and modifications may be made within the scope of the invention. In particular, the embodiments incorporating burn off devices is not absolutely necessary if the soot chamber is to be used alone. In addition, other configurations of soot filter bodies 4, are possible and useful within the scope of the invention. For example, instead of providing separate pipes 12 which penetrate the mid chamber 7, it is possible to have them molded directly to the filter body 4, which would be especially easy, if it is molded out of ceramics.

I claim:

1. A soot filter for diesel engines comprising:
    an encased filter unit having a first and second end, said filter unit attached at said fist end to an exhaust gas supply from said diesel engine and attached at said second end to an exhaust discharge line, whereby unrefined exhaust gases from said diesel engine enter said filter unit at said first end and whereby refined exhaust gases may exit said filter unit at said second end, said filter unit including:
    a plurality of first elongated hollow parallel channels, each of said first channels having a first and second end, said first end open to said exhaust gas supply from said diesel engine:
    a plurality of second elongated hollow parallel channels, each of said second channels having a first and second end, said second end of said second parallel channels being in communication with a refined gas discharge line, said first end of said second parallel channels are separated by filter walls; and,
    means exhausting said unrefined exhaust gases through said second end of each of said first parallel channels to a closable soot discharge vent when said closable soot discharge vent is open.

2. A soot filter as claimed in claim 1 wherein said means for exhausting said unrefined exhaust gases through said second end of each of said fist parallel channels to a closable soot discharge vent comprises a soot chamber located within said filter unit between said second end of each of said fist parallel chambers and said second end of said filter unit;
    whereby said second end of said first parallel channels are connected to said closable soot discharge vent through said soot chamber.

3. A soot filter as claimed in claim 2 wherein each of said second parallel channels are connected to said exhaust discharge line at said second end of said second parallel channels by pipes sealingly extended through said soot chamber thereby connecting said second end of said second parallel channels to said exhaust discharge line whereby gases within said soot chamber do not mix with gases within said second parallel channels, said pipes, or said second end of said filter unit and gases within said second parallel channels, said pipes, or said second end of said filter unit do not mix with gases within said soot chamber.

4. A soot filter as claimed in claim 1 further comprising a soot bag attached to said closable soot discharge vent to collect soot expelled under pressure from said soot chamber when said soot discharge vent is open.

5. A soot filter as claimed in claim 1 further comprising a first soot burn-off device to burn the soot accumulated on the inside walls of said first parallel channels, said first burn-off device located near said first end of said filter unit comprising:
    means for supplying air to said first burn-off device;
    means for supplying fuel to said first burn-off device; and
    means for igniting air and fuel supplied by said means for supplying air and said means for supplying fuel.

6. A soot filter as claimed in claim 5 further comprising:
    a by-pass line between said soot discharge vent and said exhaust discharge line;
    an intermediate soot filter located intermediate said by-pass line; and
    a second soot burn-off device located intermediate said by-pass line.

7. A soot filter as claimed in claim 5 wherein the outer wall of said first end of said filter unit comprises a double wall creating a chamber, said chamber having at least one said first soot burn-off device attached to said double wall.

8. A soot filter as claimed in claim 7 wherein said means for supplying air include valves which allow pulsed release of air into said chamber.

9. A soot filter as claimed in claim 1 further comprising a means for suctioning gases, said means for suctioning gases placed downstream from said filter body along said exhaust discharge line whereby gases are pulled through said soot filter.

10. A soot filter as claimed in claim 1 further comprising a means for suctioning gases attached to the side of said exhaust discharge line whereby gases are pulled through said soot filter.

11. A soot filter as claimed in claim 1 further comprising a gas-diffusor filter placed intermediate said exhaust gas supply and said first and second parallel channels.

12. A soot filter as claimed in claim 11 wherein said gas-diffusor filter is a catalytic converter.

13. A soot filter as claimed in claim 12 wherein said catalytic converter is honey-comb shaped.

14. A soot filter for diesel engines comprising:
    an encased filter unit having a first and second end, said filter unit attached at said first end to an exhaust gas supply from said diesel engine and attached at said second end to an exhaust discharge line, whereby unrefined exhaust gases from said diesel engine enter said filter unit at said first end and whereby refined exhaust gases may exit said filter unit at said second end, said filter unit including:

a plurality of first elongated hollow parallel channels, each of said first channels having a first and second end, said first end open to said exhaust gas supply from said diesel engine;

a plurality of second elongated hollow parallel channels, each of said second channels having a first and second end, said second end of said second parallel channels being in communication with a refined gas discharge line said first end of said second parallel channels being closed, wherein said first and second parallel channels ar parallel to each other and directed along the longitudinal axis of said filter unit and wherein said first and second parallel channels are separated by filter walls;

a soot chamber connecting said second end of each of said first parallel channels to a closable soot discharge vent, said soot chamber located within said filter unit between said second end of each of said first parallel chambers and said second end of said filter unit;

a first soot burn-off device to burn the soot accumulated on the inside walls of said first parallel channels, said first burn-off device located near said first end of said filter unit including:

means for supplying air to said first burn-off device;

means for supplying fuel to said first burn-off device; and means for igniting air and fuel supplied by said means for supplying air and said means for supplying fuel;

a by-pass line between said soot discharge vent and said exhaust discharge line;

an intermediate soot filter located intermediate said by-pass line; and a second soot burn-off device located intermediate said by-pass line so as to burn-off soot located in said soot filter located intermediate said by-pass line.

* * * * *